Figure 1:
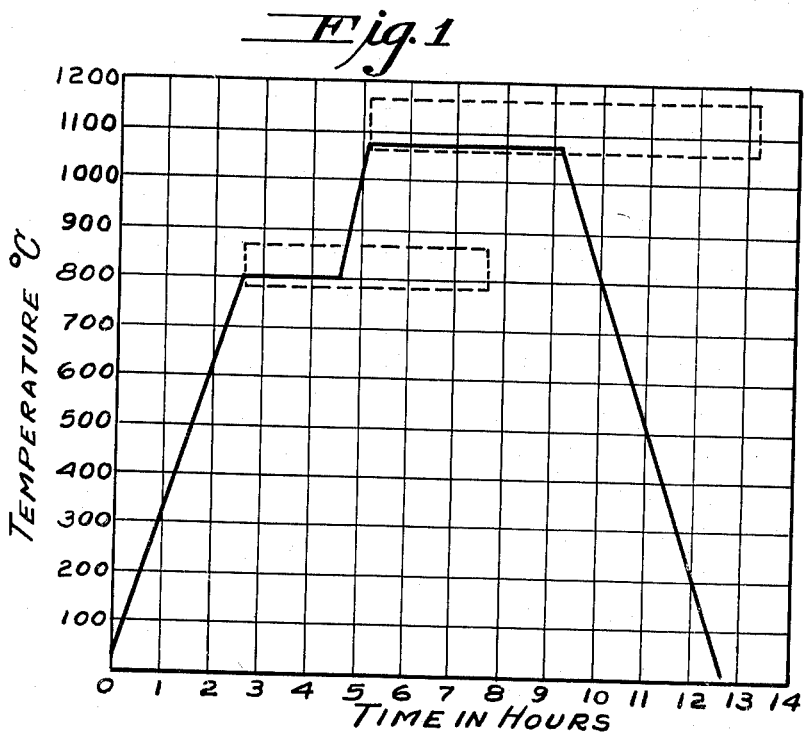

GLASS CERAMIC BODIES AND METHOD OF MAKING THEM

John F. MacDowell, Painted Post, N.Y., assignor to Corning Glass Works, Corning, N.Y., a corporation of New York
Filed July 23, 1962, Ser. No. 211,794
4 Claims. (Cl. 106—39)

This invention relates to the manufacture of glass-ceramic articles in the system

$Na_2O \cdot BaO \cdot Al_2O_3 \cdot SiO_2 \cdot TiO_2$.

The manufacture of glass-ceramic articles or semicrystalline ceramic bodies, as they are otherwise frequently referred to, involving the controlled crystallization of a glass in situ by means of a special heat treating process, is a relatively recent development in the glass art. United States Patent No. 2,920,971 sets forth, in detail, the mechanisms and theoretical considerations comprehended in the production of glass-ceramic bodies. However, in general terms, the process normally consists of adding a nucleating or crystallization-promoting agent to a glass-forming batch, melting the batch, simultaneously cooling and shaping the melt into a glass body, and thereafter heat treating the glass shape pursuant to a specific time-temperature schedule. The special heat treatment results in the glass shape being converted into a body composed of fine-grained crystals randomly oriented and substantially uniformly dispersed throughout a glassy matrix, the crystals comprising the major portion of the mass of the body. The semicrystalline constitution of the body causes its physical properties to be vitally different from those of the original glass. Of extreme interest and importance is the fact that the crystallization of the glass in situ permits the manufacture of substantially homogeneous bodies of fine-grained crystals which are essentially free of voids and are non-porous. Still further, as the material is first a glass, the articles can be fashioned into almost any configuration using the conventional methods of shaping glass such as blowing, casting, drawing, pressing, or spinning.

The development of glass-ceramics has provided a new dimension in materials useful for missile nose cones, electrical and thermal insulators, dinnerware, and cooking ware. Because the major portion of the mass of these bodies is composed of crystals, the hardness, strength, and, frequently, the resistance to thermal shock of these bodies are much superior to those of the original glass. Also, the softening point of these bodies is generally at a much higher temperature than that of the base glass.

In no other field has there been greater interest or more intensive research in developing useful glass-ceramics than in the field of dinnerware. The material has many of the attributes of fine china including color, surface appearance, and feel and yet possesses other physical properties which render it a superior product when viewed from a utilitarian aspect. The mechanical strength and resistance to thermal shock of the semicrystalline ceramic bodies are of a much higher magnitude than china. The semicrystalline body is much less porous and much more resistant to abrasion. However, the costs of production of glass-ceramics are greater than of inexpensive china and pottery. Therefore, in order to offset this economic disadvantage, there has been a constant striving to secure products which were much stronger mechanically and thermally, much more resistant to abrasion and staining by food products, such that the consumer would be attracted by a better product. At the same time a considerable amount of work has been done in attempting to obtain the appearance and feel of really fine china in the glass-ceramic body. The appearance and feel of fine china are due, in part at least, to the glazes applied thereon. Therefore, the glass-ceramic body must be compatible with the glazes desired. Thus, the purity of the body, the texture of the body, the weight of the body, and the color have been studied with regard to their counterparts in fine china.

The dinnerware field is generally divided into two broad areas: the individual or home consumer and the institutional consumer, i.e., the restaurant, the hotel, and the like. Market analyses have indicated that the characteristics in the product desired by substantially all home users of dinnerware include: mechanical strength to resist breaking and chipping; good resistance to thermal shock; good resistance to staining by food products; good resistance to attack by acids and alkalies in foods and cleaning detergents and soaps (chemical durability); and an appearance and feel similar to fine china. Surveys of institutional consumers have indicated their need for products having very high mechanical strength and very good resistance to thermal shock.

Therefore, the principal object of this invention is to provide glass-ceramic bodies having high strength, high resistance to thermal shock, high resistance to abrasion, capable of accepting and retaining a glaze, good chemical durability, high resistance to staining, and yet possessing the appearance and feel of fine china.

Another object of this invention is to provide glass-ceramic articles which are particularly suitable for use as dinnerware.

Still another object of this invention is to provide a method of manufacturing such a glass-ceramic body which is relatively simple in operation and economical in practice.

I have found that a very narrow range of glass compositions in the $Na_2O \cdot BaO \cdot Al_2O_3 \cdot SiO_2 \cdot TiO_2$ system, viz., 10–20% $Na_2O$, 1–20% BaO, 28–38% $Al_2O_3$, 30–55% $SiO_2$, and 5–12% $TiO_2$, when subjected to a rather rigidly controlled heat treating step, yields semicrystalline ceramic bodies possessing the physical appearance and properties rendering them eminently suitable for use in dinnerware.

In United States Patent No. 2,920,971, issued to Stanley D. Stookey, is described a wide range of glass compositions which can be nucleated, through the addition of $TiO_2$, to yield semicrystalline ceramic bodies. Over 100 examples are cited therein to show the versatility, indeed the substantial universality, of $TiO_2$ as a nucleating agent for glass compositions. The patentee explains, in detail, that the physical properties and characteristics of his glass-ceramic bodies depend upon the composition of the original glass, the heat treatment given the glass body, and the crystalline phase or phases which are precipitated out of the glass during the heat treating step. It is apparent that the first two parameters determine the constitution and quantity of the crystalline phase or phases present while the crystallization directly influences the physical properties and characteristics of the body. Thus, the kind of crystalline phase produced is determinative of the behavior of the product.

I have discovered that glass-ceramic bodies wherein the crystalline phase consists of a mixture of nepheline ($Na_2O \cdot Al_2O_3 \cdot 2SiO_2$) and celsian or hexacelsian (dimorphs of $BaO \cdot Al_2O_3 \cdot 2SiO_2$) possess properties which make them excellent materials for dinnerware applications. These phases are the major crystalline constituents precipitated from glasses containing the range of compositions set out hereinabove. The Stookey patent contains no reference to the desirability of these crystal phases in glass-ceramic bodies particularly suitable for dinnerware nor of the critical composition limits necessary to obtain such crystal growth.

I have further discovered that in order to obtain the desired crystalline phases of nepheline and celsian or hexacelsian, the heat treatment of the glass bodies is extremely critical. Thus, my invention in its preferred embodiment, comprises melting a batch containing the requisite constituents, simultaneously shaping and cooling the melt to a temperature below the transformation point, i.e., the temperature at which the liquid melt is considered to become an amorphous solid, this temperature being in the vicinity of the annealing point of the glass (the annealing points of the glasses of this invention ranging from about 700°–725° C.), after which the temperature of the body is raised to about 780°–860° C., held thereat for a time sufficient to initiate nucleation of the crystalline phases, the temperature of the body then raised to about 1060°–1160° C., held thereat for a time sufficient to attain the desired crystallization, and then cooling the body to room temperature. In this preferred embodiment of the invention, i.e., a distinct two-step heat treating schedule, the holding time at the nucleation temperature suitably ranges from 1 to 5 hours, with about four hours appearing to be optimum, while the holding time at the crystallization temperature ranges from 1 to 8 hours, with about 4 hours again appearing to be the optimum.

Variations in procedure from the preferred embodiment of my invention are possible. During the cooling and shaping of the melt into a glass body, the shape may be cooled to room temperature for inspection and decorating before commencing the heat treating schedule. Generally, the glass articles are heated to the nucleation temperature at about 5° C./minute. This rate of heating has been chosen through experimentation in the desire to protect the glass from breakage due to thermal shock and from deformation. It will be appreciated that two factors must be considered in the selection of the heating rate: (1) the coefficient of the thermal expansion of the glass itself; and (2) the physical size and shape of the article. Although much faster heating rates have proved feasible in some cases, particularly with thin-walled shapes, the 5° C./minute rate has been found to yield sound bodies in all instances.

Although a two-step heat treating cycle is preferred, I have learned that a satisfactory crystallized article can be obtained where the glass shape is heated at a substantially constant rate from room temperature or the transformation point to temperatures within the range of 1000°–1160° C. and held thereat for a period of time sufficient to attain the desired crystallization. Differential Thermal Analysis and X-ray diffraction analysis data have indicated that there is a development of a phase separation in the nucleation temperature range, i.e., about 780°–860° C. At temperatures around 950°–980° C., crystals of carnegieite are formed. At temperatures over 1000° C., the carnegieite crystals are transformed to nepheline and celsian or hexacelsian crystallizes out. Therefore, a heat treating temperature of at least 1000° C. is necessary to obtain the desired crystal phases. The transformation of carnegieite to nepheline and the crystallization of celsian or hexacelsian occur more rapidly at higher temperatures. Thus, at 1000° C. a period of time of 24 hours or even longer may be required to attain the desired dense crystallization, while at 1160° C. a hold of but one hour will frequently be sufficient.

The rate of heating which the glass bodies can tolerate after the transformation point is passed depends principally upon the rate of crystallization occurring within. When a glass body is heated above the transformation point, softening of the body occurs and deformation can take place. However, as noted hereinabove, the crystallization of the glass during the heat treating process proceeds more rapidly as the temperature approaches the liquidus of the crystalline phase. Thus, in the two-step heating cycle, the glass article is first heated to just above the transformation point to initiate crystallization and then raised to a considerably higher temperature to expedite and increase crystallization. The softening point and, therfore, the deformation temperature of the semi-crystalline body is generally considerably higher than the base glass. Hence, the rate of heating the glass body must be balanced against the speed at which crystals are formed within the body. In the early stages of crystallization, the proportion of glassy matrix is large and the article is deformable if its temperature is raised too rapidly.

Although heating rates greater than 5° C./minute have been used successfully with small articles, particularly in the two-step heat treating cycle where a hold at the nucleation temperatures has been employed, I prefer a heating rate of not more than 5° C./miunte where crystallization is induced through a substantially constant heating rate of not more than 5° C./minute where crysfound to be satisfactory in most cases in preventing excessive deformation of the glass article as it is being heated above its softening point and before crystallization has progressed far enough to support the body. It is obvious that much slower rates would likewise yield satisfactory bodies. Likewise, it is apparent that the use of physical support for the glass bodies will aid in inhibiting deformation during heat treating. Nonetheless, in each instance, the heating rate must be adjusted so that it does not exceed the speed of internal crystallization.

Thus, my invention can be considered to consist of three essential steps: (1) melting a specific glass-forming batch; (2) simultaneously quenching the melt below the transformation point and shaping it into a glass body; and (3) heat treating the glass body at about 1000°–1160° C. for a time sufficient to attain the desired crystallization of nepheline and celsian or hexacelsian.

The rate of cooling the crystalline article to room temperature is dependent upon it resistance to thermal shock and the physical size and shape of the article. A 5° C./minute cooling rate has yielded sound bodies in all instances although much faster rates are useable with relatively small or thin articles. Often, the heat treating furnace is merely allowed to cool at its own rate.

As noted hereinabove, the compositional limits of the glass-forming components are extremely critical to the invention. Titania must be present to act as a nucleating agent and to insure dense, fine-grained crystallization. However, when more than about 12% $TiO_2$ is present, devitrification occurs such that a glass body cannot be formed unless the melt is severely quenched. With less than about 28% alumina and/or 5% $TiO_2$, effective nucleation of the crystal phases cannot be accomplished whereas, when more than about 38% alumina is present, the batch becomes extremely difficult to melt at conventional glass-melting temperatures, thereby necessitating the use of higher melting temperatures with accompanying greater corosion of the melting unit refractories. The amounts of soda and baria must be strictly controlled to insure the production of nepheline and celsian or hexacelsian in the proper crystalline sequence and in the desired amount and crystal size.

In the following examples, recorded in Table I, glass-forming batches were compounded having compositions falling within the aforementioned ranges calculated from their respective batches to the oxide basis in weight percent, exclusive of impurities which may be present in the batch materials. The batch may comprise any materials, either oxides or other compounds which, on being fused together, are converted to the desired oxide composition in the required proportion.

In the examples given, each of the glass-forming batches was ball-milled prior to melting to aid in securing a homogeneous melt. The batches were then melted at about 1600° C. for about 16 hours in crucibles, pots, or tanks, depending upon the quantity of product desired. The melts were poured into steel molds and flat discs were pressed out. These discs were maintained at 725° C. for one hour and then cooled slowly to room temperature to complete the annealing process. Thereafter, the discs were placed in a furnace and heated at about 5° C./minute to the first level of heat treatment, as recorded in Table II, and held thereat for a sufficient time to initiate nucleation. The temperature of the furnace was then raised at 5° C./minute to the second level of heat treatment after which the supply of heat to the furnace was cut off and the furnace permitted to cool to room temperature with the discs contained therein.

Table II also records the moduli of rupture (p.s.i.), densities (gm./cc.), and coefficients of thermal expansion ($x10^{-7}/°$ C.) of the glass-ceramic bodies as well as a description of the body and the crystal phases present, as determined by X-ray diffraction analysis. Although physical properties and crystal structure data were not obtained in every composition studied, each example represents a batch which was actually melted and heat treated to yield a semicrystalline ceramic. The modulus of rupture measurements were obtained by the conventional method using rods which had been abraded with 30-grit silicon carbide. The methods of measuring density and linear thermal expansion coefficient are also well known and the values set forth in Table II represent the average expansion coefficient between 25° C. and 300° C.

TABLE I

| | 1 | 2 | 3 | 4 | 5 | 6 | 7 | 8 | 9 |
|---|---|---|---|---|---|---|---|---|---|
| $SiO_2$ | 44.4 | 44.4 | 43.5 | 42.6 | 40.7 | 40.7 | 40.0 | 38.9 | 38.2 |
| $Al_2O_3$ | 30.0 | 30.0 | 30.0 | 30.0 | 30.0 | 30.0 | 29.1 | 30.0 | 29.1 |
| BaO | 3.7 | 5.6 | 5.6 | 7.4 | 7.4 | 9.2 | 10.9 | 11.1 | 12.7 |
| $Na_2O$ | 14.8 | 12.9 | 13.9 | 12.9 | 14.8 | 12.9 | 10.9 | 12.9 | 10.9 |
| $TiO_2$ | 7.4 | 7.4 | 7.4 | 7.4 | 7.4 | 7.4 | 9.1 | 7.14 | 9.1 |

| | 10 | 11 | 12 | 13 | 14 | 15 | 16 | 17 | 18 |
|---|---|---|---|---|---|---|---|---|---|
| $SiO_2$ | 36.4 | 37.0 | 42.6 | 40.7 | 38.9 | 38.9 | 38.9 | 35.2 | 37.0 |
| $Al_2O_3$ | 29.1 | 30.0 | 31.5 | 31.5 | 31.5 | 31.5 | 31.5 | 31.5 | 31.5 |
| BaO | 12.7 | 14.8 | 3.7 | 7.4 | 6.5 | 9.2 | 11.1 | 12.9 | 13.9 |
| $Na_2O$ | 12.7 | 11.1 | 14.8 | 13.9 | 15.7 | 12.9 | 11.1 | 12.9 | 10.2 |
| $TiO_2$ | 9.1 | 7.4 | 7.4 | 7.4 | 7.4 | 7.4 | 7.4 | 7.4 | 7.4 |

| | 19 | 20 | 21 | 22 | 23 | 24 | 25 | 26 |
|---|---|---|---|---|---|---|---|---|
| $SiO_2$ | 35.2 | 33.3 | 38.9 | 37.0 | 35.2 | 31.5 | 31.5 | 43.1 |
| $Al_2O_3$ | 31.5 | 31.5 | 33.3 | 33.3 | 33.3 | 33.3 | 35.2 | 30.1 |
| BaO | 13.9 | 15.7 | 7.4 | 11.1 | 11.1 | 16.7 | 14.8 | 5.6 |
| $Na_2O$ | 10.2 | 12.0 | 12.9 | 11.1 | 12.9 | 11.1 | 11.1 | 13.9 |
| $TiO_2$ | 7.4 | 7.4 | 7.4 | 7.4 | 7.4 | 7.4 | 7.4 | 7.3 |

In some instances, a fining agent was added to the glass batch. This fining agent commonly was $As_2O_3$ and was generally added in amounts up to about 1% by weight. The $As_2O_3$ was omitted from Table I for convenience, since the residual amount remaining in the glass is too small to have any material effect on its fundamental properties.

TABLE II

| No. | Heat Treat. Schedule | Sample Description | Crystal Phases | Mod. of Rupture | Exp. Coef. | Density |
|---|---|---|---|---|---|---|
| 1 | 830°–4 hr. 1,140°–4 hr. | White-ivory, fine to med. grained | Nepheline celsian | 15,010 | 103.6 | 2.683 |
| 2 | 855°–4 hr. 1,060°–4 hr. | Blue-white, fine to med. grained | | | | |
| 3 | 820°–4 hr. 1,140°–4 hr. | White-ivory, fine grained | Nepheline celsian | 13,280 | 96.8 | 2.742 |
| 4 | 820°–4 hr. 1,140°–4 hr. | Ivory-white, fine grained | ____do____ | 14,010 | 91.5 | 2.774 |
| 5 | 820°–4 hr. 1,140°–4 hr. | Ivory, fine grained | ____do____ | 12,070 | 98.8 | 2.776 |
| 6 | 820°–4 hr. 1,140°–4 hr. | Ivory-white, fine grained | ____do____ | 12,290 | 91.2 | 2.821 |
| 7 | 855°–4 hr. 1,110°–4 hr. | Gray-white, fine to med. grained | Nepheline celsian rutile | | 80.7 | 2.847 |
| 8 | 850°–4 hr. 1,150°–4 hr. | Ivory-white, fine grained | Nepheline celsian | | 88.6 | 2.852 |
| 9 | 860°–4 hr. 1,155°–4 hr. | ____do____ | Nepheline celsian rutile | 12,840 | 79.8 | 2.910 |
| 10 | 855°–4 hr. 1,110°–4 hr. | Gray-white, fine grained | Nepheline hexacelsian | | 107.5 | 2.888 |
| 11 | 850°–4 hr. 1,150°–4 hr. | Ivory-white, fine grained | ____do____ | | 110.7 | 2.864 |
| 12 | 830°–4 hr. 1,130°–4 hr. | White, fine grained | Nepheline celsian | | 102.5 | 2.703 |
| 13 | 815°–4 hr. 1,140°–4 hr. | ____do____ | ____do____ | 12,460 | 95.6 | 2.747 |
| 14 | 825°–4 hr. 1,125°–4 hr. | White-ivory, fine to med. grained | | | | |
| 15 | 820°–4 hr. 1,140°–4 hr. | Ivory-white, fine grained | Nepheline celsian | 12,760 | 88.8 | 2.831 |
| 16 | 810°–4 hr. 1,130°–4 hr. | White-ivory, fine grained | ____do____ | 13,000 | 81.4 | 2.865 |
| 17 | 830°–4 hr. 1,135°–4 hr. | Ivory-white, fine to med. grained | Nepheline hexacelsian | 16,340 | 106.7 | 2.880 |
| 18 | 810°–4 hr. 1,130°–4 hr. | White-ivory, fine grained | Nepheline celsian | 16,580 | 75.4 | 2.921 |
| 19 | 830°–4 hr. 1,135°–4 hr. | Ivory-white, fine grained | Nepheline hexacelsian | | 108.2 | 2.937 |
| 20 | 830°–4 hr. 1,145°–4 hr. | ____do____ | | | | |
| 21 | 830°–4 hr. 1,135°–4 hr. | ____do____ | Nepheline celsian | 12,700 | 91.0 | 2.798 |
| 22 | 830°–4 hr. 1,145°–4 hr. | White-ivory, fine to med. grained | ____do____ | | 81.4 | 2.876 |
| 23 | 830°–4 hr. 1,145°–4 hr. | White-ivory, fine grained | | | | |
| 24 | 835°–5 hr. 1,155°–7 hr. | Ivory-white, fine grained | | 16,150 | | |
| 25 | 835°–4 hr. 1,155°–2 hr. | White, fine grained | | | | |
| 26 | 800°–2 hr. 1,070°–4 hr. | ____do____ | Nepheline celsian | 12,100 | 97.0 | 2.731 |

Tables I and II illustrate the narrow range of glass compositions which can be converted by heat treatment into semicrystalline articles containing nepheline and celsian or hexacelsian. These articles display an average abraded modulus of rupture greater than 12,000 p.s.i. and, when glazed, exhibit an average abraded modulus of rupture greater than 30,000 p.s.i. Each of these bodies at room temperature is able to withstand immersion in boiling water and a sudden temperature drop from at least 140° C. to 0° C. The crystal content of the articles has been determined to be at least 50 weight percent, this depending upon the extent to which the components of the batch are adaptable to the formation of crystal phases. The crystals, themselves, are very fine grained, i.e., substantially all finer than about 30 microns in diameter and are randomly dispersed throughout the glassy matrix.

The products of my invention are particularly suitable for use by the individual or home consumer. However, their mechanical strength and resistance to thermal shock have been found adequate to recommend them to the institutional user also.

Example 26 is my preferred composition because it best satisfies the requirements listed hereinabove for a glass-ceramic dinnerware body. Articles made from this composition readily accept a glaze and their color and feel are substantially equivalent to fine china. They exhibit very high strength after glazing (a modulus of rupture of 41,600 p.s.i.), are extremely resistant to staining by foods, and display excellent durability to the action of detergents.

Although in each of the above examples the melt was shaped by pressing into molds, it will be understood that any of the conventional glass forming methods such as blowing, casting, drawing, rolling, or centrifugal casting are also applicable to my invention.

FIG. 1 is a time-temperature chart setting forth a specific heat treating schedule, viz., that given in Example 26. After the batch was melted in an open crucible, shaped, and cooled to room temperature, the disc was placed in a furnace, raised to a temperature of 800° C. at the rate of 5° C./minute, and held thereat for a period of 2 hours. The temperature was then raised to 1070° C. at the rate of 5° C./minute, maintained thereat for a period of 4 hours, after which the heat to the furnace was cut off and it was allowed to cool to room temperature with the disc within. As will be surmised, this cooling rate was not linear but was more rapid at higher temperatures. However, for convenience in completing the drawing, an average cooling rate of 5° C./minute has been chosen. The area enclosed within the dotted lines represents the ranges of the times and temperatures of my preferred two-step process.

Figure 2:
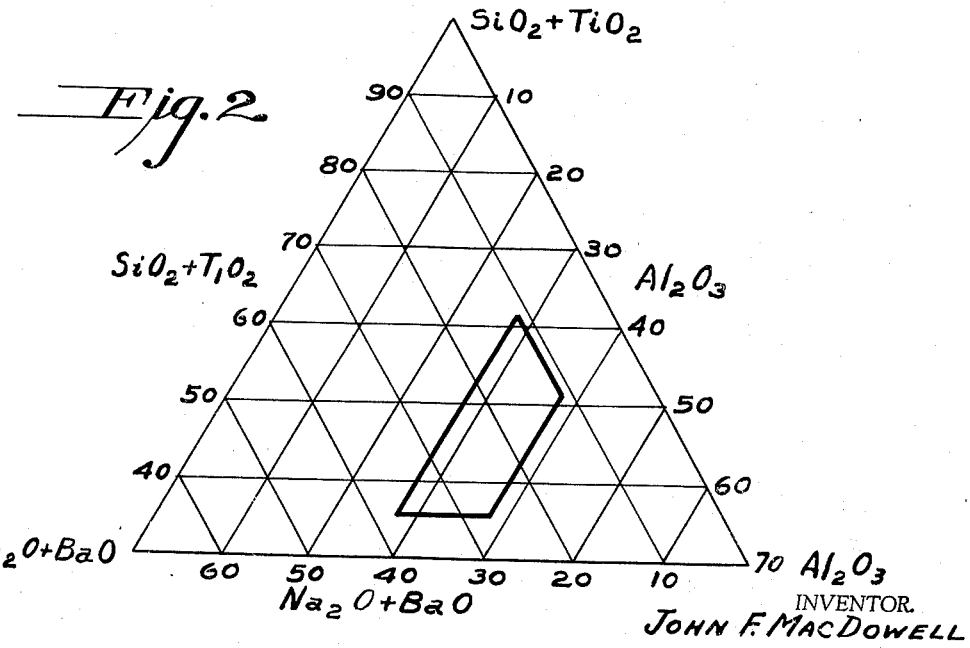

Although this invention comprehends a five-component system, the ternary diagram, FIG. 2, is submitted to aid in visualizing the desired compositions wherein $Al_2O_3$ constitutes one coordinate, $SiO_2+TiO_2$ the second, and $Na_2O+BaO$ the third.

What is claimed is:

1. A semicrystalline ceramic body particularly suitable for use as dinnerware having a coefficient of thermal expansion between $75.4–110.7 \times 10^{-7}/°$ C. and consisting essentially of crystals of nepheline and a dimorph of $BaO \cdot Al_2O_3 \cdot 2SiO_2$ selected from the group consisting of celsian and hexacelsian randomly dispersed in a glassy matrix, said crystals being substantially all smaller than 30 microns in diameter, constituting at least 50% by weight of the semicrystalline ceramic body, and being formed by crystallization in situ from a glass body consisting essentially, by weight, of 10–20% $Na_2O$, 1–20% BaO, 28–38% $Al_2O_3$, 30–55% $SiO_2$, and 5–12% $TiO_2$ as a nucleating agent, said glassy matrix consisting essentially of the uncrystallized portion of the glass remaining after the crystallization of said crystals.

2. A method of manufacturing a semicrystalline ceramic body particularly suitable for use as dinnerware having a coefficient of thermal expansion between $75.4–110.7 \times 10^{-7}/°$ C. and consisting essentially of crystals of nepheline and a dimorph of $BaO \cdot Al_2O_3 \cdot 2SiO_2$ selected from the group consisting of celsian and hexacelsian randomly dispersed in a glassy matrix, said crystals being substantially all smaller than 30 microns in diameter and constituting at least 50% by weight of the semicrystalline body, which comprises melting a glass-forming composition essentially, by weight of 10–20% $Na_2O$, 1–20% BaO, 28–38% $Al_2O_3$, 30–55% $SiO_2$, and 5–12% $TiO_2$ as a nucleating agent, simultaneously cooling the melt below its transformation point and forming a glass shape therefrom, thereafter heating said shape at a rate not exceeding about 5° C./minute to a temperature of about 1000°–1160° C., maintaining thereat for at least one hour to attain the desired crystallization, and then cooling said shape to room temperature.

3. A method according to claim 2 wherein the time to attain the desired crystallization ranges from 1–24 hours.

4. A method of manufacturing a semicrystalline ceramic body particularly suitable for use as dinnerware having a coefficient of thermal expansion between $75.4–110.7 \times 10^{-7}/°$ C. and consisting essentially of crystals of nepheline and a dimorph of $BaO \cdot Al_2O_3 \cdot 2SiO_2$ selected from the group consisting of celsian and hexacelsian randomly dispersed in a glassy matrix, said crystals being substantially all smaller than 30 microns in diameter and constituting at least 50% by weight of the semicrystalline body, which comprises melting a glass-forming composition consisting essentially, by weight, of 10–20% $Na_2O$, 1–20% BaO, 28–38% $Al_2O_3$, 30–55% $SiO_2$, and 5–12% $TiO_2$ as a nucleating agent, simultaneously cooling the melt below its transformation point and forming a glass shape therefrom, thereafter heating said shape to a temperature of about 780°–860° C., maintaining thereat for about 1–5 hours to initiate nucleation of the crystalline phase, subsequently heating said shape to a temperature of about 1060°–1160° C., maintaining thereat for about 1–8 hours to attain the desired crystallization, and then cooling said shape to room temperature.

References Cited by the Examiner

UNITED STATES PATENTS 2,920,971  1/60  Stookey _____ 106—39

TOBIAS E. LEVOW, *Primary Examiner.*